July 13, 1954 M. CAMRAS 2,683,774

ELECTROMAGNETIC TRANSDUCER HEAD

Filed Dec. 23, 1948 2 Sheets-Sheet 1

Inventor
Marvin Camras by The Firm of Charles W. Hills Attys

July 13, 1954 M. CAMRAS 2,683,774

ELECTROMAGNETIC TRANSDUCER HEAD

Filed Dec. 23, 1948 2 Sheets-Sheet 2

Inventor
Marvin Camras by [signature] Attys

Patented July 13, 1954 2,683,774

UNITED STATES PATENT OFFICE 2,683,774

ELECTROMAGNETIC TRANSDUCER HEAD

Marvin Camras, Chicago, Ill., assignor to Armour Research Foundation of Illinois Institute of Technology, Chicago, Ill., a corporation of Illinois Application December 23, 1948, Serial No. 67,020

11 Claims. (Cl. 179—100.2)

This invention relates to magnetic recording apparatus, and more particularly, to electromagnetic transducer heads adaptable to both single and double track magnetic record tapes.

One of the greatest sources of difficulty in the manufacture of magnetic recording and reproducing apparatus has always been the manufacture and design of the electromagnetic transducer head employed thereon. The particular nature and characteristics of the magnetic circuits of the head have been found to be extremely important in the fidelity of response and efficiency of operation. The extremely small dimensions have also presented problems of manufacture which have heretofore kept the cost of heads unduly high.

One of the principal features and objects of the present invention is to provide a novel electromagnetic transducer head which is economical to manufacture, which is efficient in operation, which gives high fidelity response and which readily lends itself to close control of tolerances in its manufacture.

A further object of the present invention is to provide a new and improved core structure for an electromagnetic transducer head.

Still another object of the present invention is to provide a novel and improved electromagnetic transducer head assembly.

Another and still further object of the present invention is to provide a novel housing and mounting structure for a recording and reproducing head and for an erase head.

A further object of the present invention is to provide a novel means for minimizing the physical wear of the active magnetic portions of magnetic heads in electromagnetic transducer assemblies.

Another and still further object of the present invention is to provide a novel casing means for an electromagnetic transducer assembly which will greatly simplify the alignment and assembly of magnetic heads mounted therein.

The novel features which I believe to be characteristic of my invention are set forth with particularity in the appended claims. My invention itself, however, both as to its manner of construction and method of operation, together with other objects and advantages thereof may best be understood by reference to the following description taken in connection with the accompanying drawings, in which:

Figures 1, 2, 3, 4, 5:
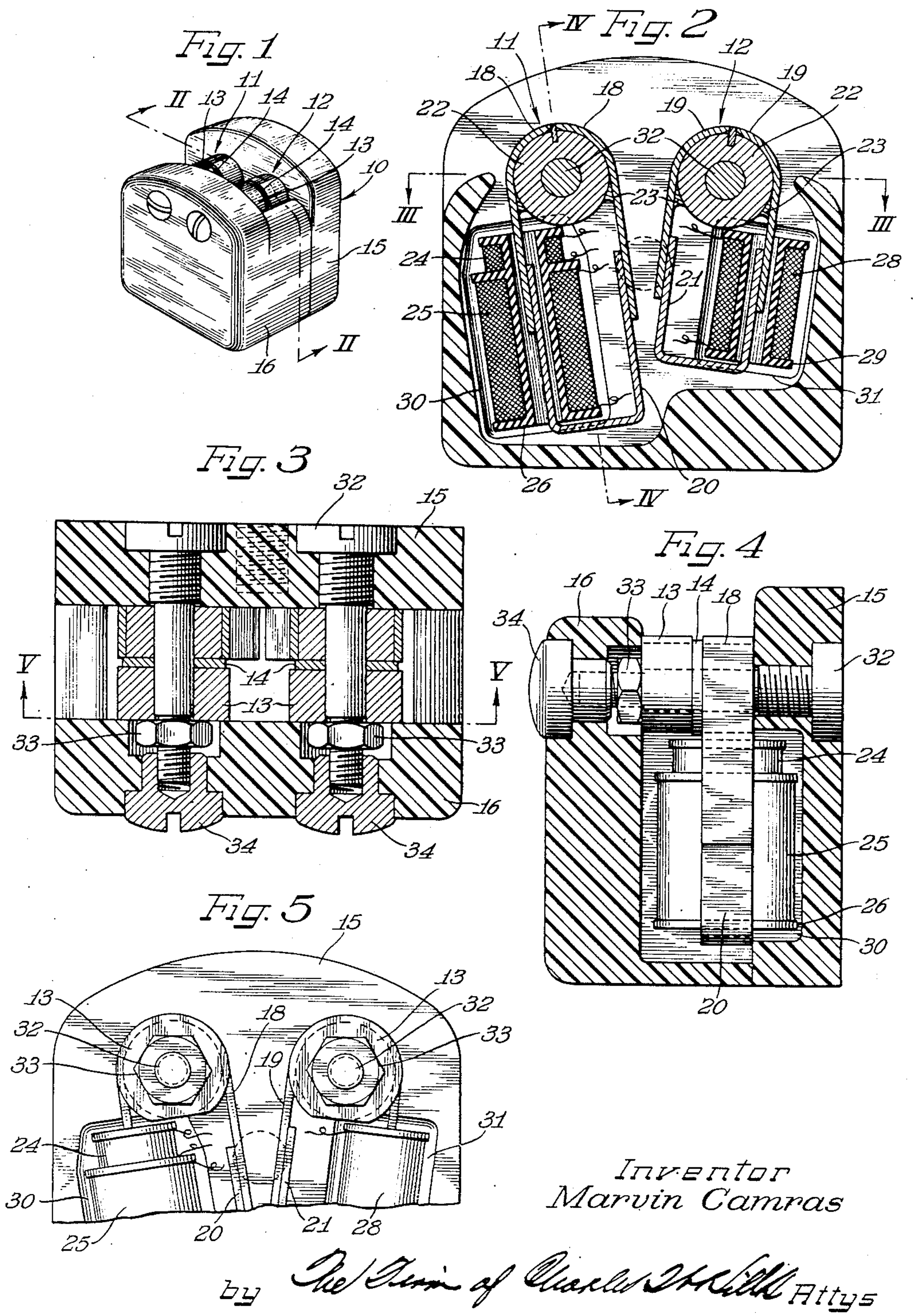
Figure 1 is a perspective view of a magnetic head embodying my invention.
Figure 2 is a sectional view of the structure shown in Figure 1 as taken on line II—II.
Figure 3 is another sectional view of the magnetic head shown in Figure 1 as taken on line III—III of Figure 2.
Figure 4 is still another sectional view of the magnetic head shown in Figure 1 as taken on line IV—IV of Figure 2.
Figure 5 is a view of some of the parts as taken on line V—V of Figure 3.

Referring now more particularly to the drawings, Figure 1 shows a magnetic head assembly 10 for a tape recorder, indicating the manner in which two electromagnetic transducer heads comprising a record-playback head 11 and an erase head 12 are aligned horizontally in a slightly protruded position above the sides of their housing to allow easy engagement with the record members passing over their faces. A pair of magnetic keepers 13 made of high-permeability low-retentivity magnetic material are formed in the shape of cylindrical spacers having the same radius of curvature as the tops of the heads 11 and 12, and are also disposed within the assembly housing alongside each other, one on each of the axes on which the heads 11 and 12 are disposed. Each of the keepers 13 is separated from its corresponding adjacently disposed head by a relatively thin spacer washer 14 made of non-magnetic material such as brass.

The housing for the assembly 10 is made of non-magnetic material, such as a suitable plastic composition, and consists of two parts, namely; a base plate 15 to which the keepers 13 are secured and a protective cap 16 enclosing the energizing coils and magnetic circuits for the heads 11 and 12. The sides of the cap 16 are slightly recessed and curved at the top to provide a guide path between the top portions of base plate 15 and the cap 16 for record members as they pass over the heads and keepers 11, 12 and 13.

The outward appearance of the active heads 11 and 12 and the keepers 13 when assembled are similar except that the heads are each provided with a close tolerance air gap across the tip, the gap in the recording head being somewhat smaller than the erase head gap. The heads themselves, therefore, are substantially identical in appearance, but their magnetic circuit elements within the housing are somewhat different.

The magnetic circuits of the transducer heads 11 and 12 consist of a pair of pole tip members 18 and 19, respectively, and magnetic yokes 20 and 21, respectively. Each pair of pole tip members is secured to a circular spacer-like support element 22 which may be made of non-magnetic material such as brass or Bakelite and is fixed thereto by suitable means such as by soldering or cementing at points 23. The tips of members 18 and 19 are curved about the outer periphery of the spacer-like support elements 22 and confront each other at the top of the assembly to form a rigid air gap for each of the heads. The tips of pole tip members 18 and 19 are beveled on their undersides to reduce the cross-sectional area of the tips and consequently increase the flux density in the air gaps. A slit may be cut in the non-magnetic spacer-like support just below the air gap to receive and position a gap spacer if desired. The pole tips of the members 18 and 19 may then be secured to the gap spacer by such means as solder or brazing material.

Figure 6:
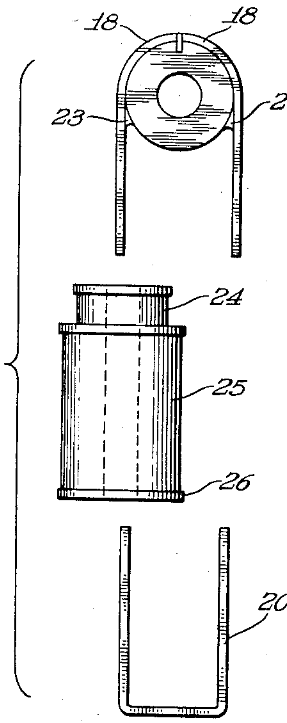
Figure 6 is an unassembled view of some of the parts utilized in my invention.

An energizing coil spool is slipped over one extension of each pair of pole tip members 22, and the yokes 20 and 21, respectively, are each slidably fitted in their respective positions with one leg inserted into one of such coil spools. The magnetic circuits for the heads are preferably made of high-permeability low-retentivity magnetic material and are made thin to reduce the amount of eddy current loss therein. The disassembled recording head 11 is illustrated in Figure 6. To assemble the parts as shown in Figure 2, the yoke is inserted between the extending pole tip legs 18. The relative dimensions of the yoke are such that a frictional engaging relationship is formed between the pole tip extensions and the yoke legs to hold the energizing coils and the magnetic circuits in proper assembled relationship. The erase head 12 is similarly held in assembled relationship by yoke 21. Under certain conditions, however, an air space may be desirable between the pole tip extensions and the legs of the yoke members in order to reduce residual magnetism, and to aid in balancing.

The recording head 11 is provided with two energizing coils, one a relatively high frequency coil 24 and the other a somewhat larger audio frequency coil 25, both of which are wound on similar portions of a common spool 26. The recording head 11 is thus arranged for magnetic recording in accordance with the principles explained in detail in the Marvin Camras United States Patent No. 2,351,004, issued on June 13, 1944, in which recording is accomplished by superimposing a magnetic field varying in accordance with an audio frequency signal upon a relatively high frequency field. The recording head 11 is also used as a playback head, but during such operation, the high frequency field windings are not energized and only the audio currents induced in the audio coil are amplified for reproduction.

The erase head 12 is provided with only one energizing coil 28 which is wound on the spool 29. During operation, erase coil 28 is fed by the same high frequency oscillator. As a matter of fact, the erase coil can be connected in series with the high frequency recording coil, if desired, since the erase operation during magnetic recording is normally performed at the same time that a recording is being made.

To make the assembly 10 more compact, each of the coil spools 26 and 29 is provided with a pocket space 30 and 31, respectively, in base plate 15 as shown in Figure 4. The pockets 30 and 31, beside enabling compactness, also provide means for properly positioning the heads 11 and 12 and maintaining physical separation of the magnetic circuits.

A pair of special mounting studs 32 hold the parts of the magnetic assembly 10 together. Each of the studs is provided with an unthreaded shank portion, on which one of the magnetic heads, a spacer 14, and a keeper 13 are mounted and secured by a hex nut 33 tightened onto a threaded end portion of the studs 32. The housing cap 16 is also held in its assembled position by the studs 32 by providing two holes in the cap 16 into which the threaded end portions of the studs 32 may extend and then threading internally threaded, slotted cap nuts 34, each inserted in a countersunk outer portion of the holes onto the threaded stud ends until the cap 16 is tightly secured to the base plate 15. The hex nut 33 on the inner surface of the cap 16 is provided with room by countersinking the inner surface edges of the holes within which the ends of the studs 32 extend.

Figure 7:
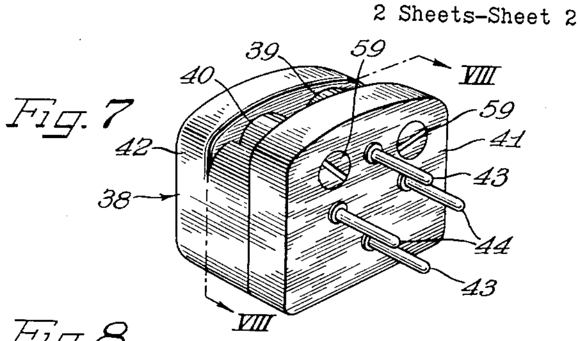
Figure 7 is a perspective view of another structural embodiment of my invention.

Another embodiment of my invention is shown in Figure 7 which illustrates a magnetic head assembly 38 having a recording head 39 and an erase head 40 horizontally aligned and protruding from a magnetic record member path between a housing base plate 41 and a housing cap 42. The appearance of magnetic head assembly 38 is somewhat similar to that shown in Figure 1, except that two pairs of prongs are secured in the base plate 41 and project therefrom to provide means whereby the whole unit may be plugged into a socket in equipment with which it may be associated.

Figure 8:
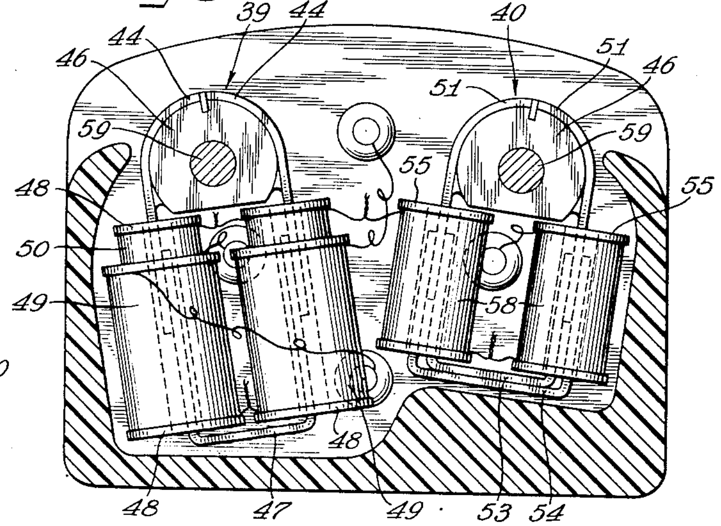
Figure 8 is a sectional view of the magnetic head shown in Figure 7 as taken on line VIII—VIII.
Figure 9:
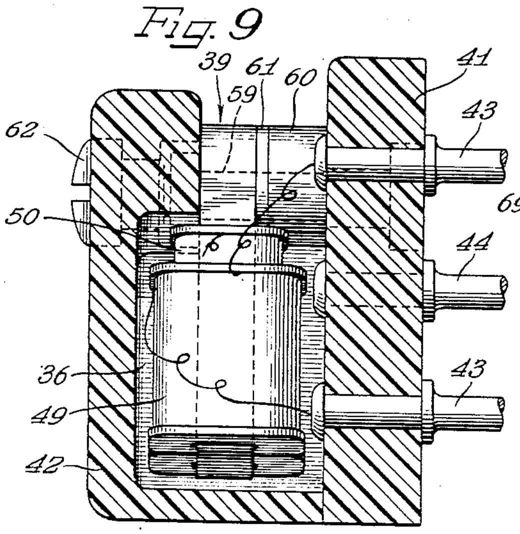
Figure 9 is another sectional view of the embodiment shown in Figure 7.

In Figures 8 and 9, the internal elements of the unit are illustrated. Energizing coils are provided on both legs of each magnetic structure for the magnetic heads in this embodiment, while in the case of erase head 40, a double yoke is provided in the magnetic circuit, thereby reducing the possibility of saturation that might otherwise occur in the yoke portion of the magnetic circuit to produce undesirable magnetic characteristics. It is apparent that such a double yoke magnetic circuit is not necessarily limited to erase heads but may in some instances also be desirable in the construction of recording heads.

The magnetic circuit for the recording head 40 comprises pole tip members 44 curved about and secured to a non-magnetic spacer-like support member 46 and a U-shaped yoke 47 having each of its legs extending up through a coil spool 48 to engage the inner surfaces of the extensions of pole tip members 44. Each of the spools 48 is provided with two winding portions, one for the audio frequency coil 49 and the upper smaller portion for a high frequency coil 50. In winding the respective pairs of coils, they are wound in additive magnetic relationship. The two audio coils thus wound are connected in series, and their two remaining ends are each connected to one of the prongs 43.

The magnetic circuit for the magnetic erase head 40 comprises a pair of pole tip members 51 curved about and secured to a non-magnetic spacer-like support 46, while a pair of yokes 53 and 54 each have their legs fitted within a hole of one of the pair of coil spools 55 and extend upwardly to make frictional engagement with the extensions of pole tip members 51 to provide a relationship which acts to maintain assembly of the magnetic circuit. Frictional engagement of the inner yoke 53 is made by the yoke legs engaging the inner surfaces of the extensions of pole tip members 51, while frictional engagement of the outer yoke 54 is caused by its ends engaging the outer surfaces of the extensions of pole tip members 51.

The spools 55 are somewhat oval in shape to reduce the need for a large dimension across the width of the magnetic head and pocket spaces 56 corresponding to each are provided in cap 42 to reduce the depth of the unit 38. The coils 58 are wound on spools 55 in additive magnetic relationship and are connected in series with each other as well as in series with the pair of high frequency coils 50 wound on recording head 39. The leads for energizing the two pairs of series connected high frequency coils 50 and 58 are connected to prongs 44.

The whole magnetic head assembly 38 is held together by a pair of mounting studs 59 passing through the base plate 41, then through a keeper 60 of magnetic material, a separator washer 61 of non-magnetic material, the spacer-like support for the magnetic circuits for the magnetic heads with which the stud is associated and then extending part-way through the cap 42.

In the illustrated embodiment, the keepers 60 are held closer to the base plate and the magnetic heads on top of them in order to keep the energizing coils 49, 50 and 58 away from the mushroomed securing ends of prongs 43 and 44. This is also done since pocket space cannot be readily provided in base plate 41 because of the prong positions therein. The assembly of parts is fastened together on base plate 41 by means of a hex nut as in the embodiment of Figure 1, and a countersunk portion on the inner surface of cap 42 provides space for the nut. A pair of slotted cap nuts 62 pass through the cap 42 from its outside surface and threadedly engage the threaded ends of studs 59. Countersunk portions on the outer surface of the cap 42 are provided for cap nuts 62 so that they will not protrude too great a distance from the surface of housing cap 42.

In utilizing the apparatus as a means for making a record on a traveling magnetizable record member, high frequency electric energy is fed to the coil 24 simultaneously with a feeding of the audio signal to the coil 25. High frequency electric energy is also fed to the coil 28 of the erase head for the purpose of demagnetizing the channel of the tape passing over the erase head 12 prior to the time when it reaches the recording head 11. On playback, it will, of course, be understood that the erase head 12 is rendered inoperative by de-energizing the erase head coil 28, and the high frequency bias winding 24 of the record-playback head 11 is also de-energized.

Figure 10:
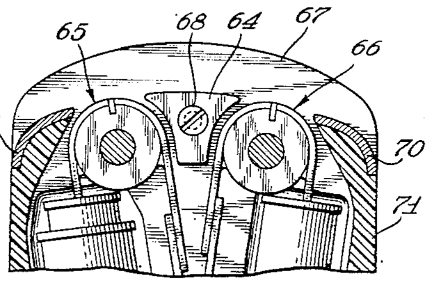
Figure 10 is a fragmentary sectional view of still another embodiment of the present invention.

Figure 10 illustrates a magnetic head assembly somewhat similar to the above described embodiments, but including record member support elements which perform the additional function of minimizing the wearing away of the active portions of the magnetic heads over which magnetic record members pass during operation of such heads. A non-magnetic shoe member 64 made of suitable wear-resistant material is disposed between a pair of aligned magnetic heads 65 and 66. The top of the shoe is arranged to have a slightly arced surface to correspond to the path of record members passing across and between the two heads while the shoe itself is rigidly secured to a base plate 67 by suitable means such as a bolt 68. In addition to the shoe 68, record support is also provided by two non-magnetic wear-resistant side extension members 69 and 70 embedded in the sides of the cap member 71 (shown in cross-section). These side extension members are so disposed and shaped that their top surfaces are also in a line corresponding to the path over which the record members associated with the head assembly will pass during operation. As shown in Figure 10, a straight line drawn between adjacent wear-resistant members cuts through the magnetic heads to a level only slightly below their top surfaces. Thus, when the active portions of the magnetic heads wear away, to such straight line levels as defined by the wear-resistant members disposed in the record member path, the magnetic heads will still be in substantially uneffected state with regard to the performance of their respective functions.

While I have shown particular embodiments of my invention, it will, of course, be understood that I do not wish to be limited thereto, since many modifications may be made, and I, therefore, contemplate by the appended claims to cover all such modifiactions that fall within the true spirit and scope of my invention.

I claim as my invention:

1. In an electromagnetic transducer head, an elongated loop formed of paramagnetic material, said loop having a gap at one end formed by confronting ends of said material, the loop at said gap being shaped to engage a traveling magnetic impulse record member passed thereover, a non-magnetic circuit support member disposed within said loop, said confronting ends of said loop being fixedly secured to the outer surface of said circuit support member and having free ends extending from said support member and at least one energizing coil surrounding a portion of one of the free ends whereby said transducer head may be energized.

2. In an electromagnetic transducer head, an elongated loop formed of thin strip of paramagnetic material, said loop having a relatively small gap at one end formed between confronting ends of said material, said loop being shaped at said gap to engage a traveling magnetic impulse record member passed thereover, a circular support member made of non-magnetic metal essentially equal in width to the width of said strip, said loop surrounding said member and having its confronting ends fixedly secured to the outer circumference of said member and having free ends extending from said support member, and at least one energizing coil surrounding a portion of one of the free ends whereby said magnetic circuit may be energized.

3. An electromagnetic transducer head comprising a non-magnetic circular circuit support, a pair of paramagnetic pole tip members, said members each having an end curved about a portion of said support, said curved pole tip members being secured in confronting relationship to each other on said support members while the other ends of said members are arranged to extend tangentially from diametrically opposite sides of said support member in parallel relationship to each other, a U-shaped paramagnetic yoke member having parallel leg portions extending between said parallel ends of said pole tip members to make frictional magnetic junctions therewith and at least one energizing coil surrounding a junction so formed.

4. An electromagnetic transducer head comprising a non-magnetic circuit support member, a pair of paramagnetic pole tip members, said pole tip members each having an end secured to a portion of said support, said secured ends being arranged in confronting relationship to each other to form a gap between them, each of said confronting ends having a beveled under-edge, said support member having a slot substantially as wide as said gap extending across said support member immediately below said gap, said pole tip members having their other ends extending from opposite sides of said support member in parallel relationship to each other, a U-shaped paramagnetic yoke member having parallel leg portions extending between said parallel ends of said pole tip members to make magnetic junctions therewith and at least one energizing coil surrounding a junction so formed.

5. An electromagnetic transducer head comprising a non-magnetic circuit support member, a pair of paramagnetic pole tip members, said pole tip members each having an end secured to a portion of said support, said secured ends being arranged in confronting relationship to each other forming a gap between them, said pole tip members having their other ends extending from opposite sides of said support member in parallel relationship to each other, a U-shaped magnetic yoke having leg ends extending between said parallel pole tip ends and making engagement with the inner sides thereof, a second U-shaped magnetic yoke having leg ends making engagement with the outer sides of said pole tip members and at least one energizing coil wound about said magnetic yoke members whereby said transducer head may be energized.

6. In combination, an electromagnetic transducer head and a short circuiting magnetic keeper, said transducer head including a pair of confronting high-permeability low-retentivity magnetic pole tip members arranged to form an air gap therebetween, a non-magnetic member to support said confronting pole tip members, a magnetic yoke extending between the end portions of said pole tip members and at least one energizing coil wound on said magnetic yoke member, said keeper being disposed coaxially with said non-magnetic member and in close proximity thereto.

7. In an electromagnetic transducer unit, a recording head having a pair of confronting magnetic pole tip members spaced by a non-magnetic gap therebetween, a non-magnetic support member secured to said pole tip members at the region of said gap, said pole tip members having end portions extending below said support member in parallel relationship, and a separate U-shaped magnetic yoke having leg members extending upwardly between said end portions, the arms of said yoke engaging said end portions in snug frictional engagement.

8. An electromagnetic transducer assembly including two confronting magnetic pole tip members defining a nonmagnetic gap therebetween, a non-magnetic support member secured to said pole tip members and spacing said pole tip members to provide said non-magnetic gap, said pole tip members having end portions extending below said support in parallel relationship, a U-shaped magnetic yoke having leg members extending upwardly between said end portions and engaging the inner surfaces of said end portions in snug frictional engagement, and a second U-shaped magnetic yoke having leg members extending upwardly and in snug frictional contact with the outer surface of said end portions.

9. An electromagnetic transducer head assembly comprising a housing assembly of non-magnetic material and substantially enclosing a pair of transducer devices, said transducer devices having an elongated loop formed of paramagnetic material, said loop having a gap at one end formed by confronting ends of said material, the loop at said gap being shaped to engage a traveling magnetic impulse record member passed thereover, a non-magnetic circuit support member disposed within said loop and carried by said housing, said confronting ends of said loop being fixedly secured to the outer surface of said circuit support member and having free ends extending from said support member, and at least one energizing coil surrounding a portion of one of said free ends whereby the transducer head may be energized.

10. An electromagnetic transducer head assembly comprising a housing of non-magnetic material substantially enclosing a pair of transducer devices and having a base plate and a cover member, each of said electromagnetic transducer devices having an elongated loop formed of paramagnetic material, said loop having a gap at one end formed by confronting ends of said material, the loop at said gap being shaped to engage a traveling magnetic impulse record member passed thereover, a non-magnetic circuit support member disposed within said loop and supported by said base plate and said cover of said housing, said confronting ends of said loop being fixedly secured to the outer surface of said circuit support member and having free ends extending from said support member, and at least one energizing coil surrounding a portion of one of the free ends whereby said transducer head may be energized.

11. In an electromagnetic transducer head assembly, in combination, a housing formed of non-magnetic material and substantially enclosing a pair of electromagnetic transducer devices, each of said electromagnetic transducer devices having a short circuiting magnetic keeper, said devices further including a pair of confronting high-permeability low-retentivity magnetic pole tip members arranged to form an air gap therebetween, a non-magnetic member to support said confronting pole tips and affixed to said housing, a magnetic yoke extending between the end portions of said pole tip members and at least one energizing coil wound on said yoke member, said keeper being disposed co-axially with said non-magnetic member and in close proximity thereto.

References Cited in the file of this patent

UNITED STATES PATENTS

| Number | Name | Date |
|---|---|---|
| 1,886,816 | Jensen | Nov. 8, 1932 |
| 1,941,477 | Jensen | Jan. 25, 1934 |
| 2,020,212 | Quam | Sept. 6, 1935 |
| 2,290,680 | Franz | July 21, 1942 |
| 2,380,300 | Gaston | July 10, 1945 |
| 2,411,849 | Camras | Dec. 3, 1946 |
| 2,413,108 | Latchford | Dec. 24, 1946 |
| 2,456,767 | Camras | Dec. 21, 1948 |
| 2,493,742 | Begun | Jan. 10, 1950 |
| 2,513,653 | Kornei | July 4, 1950 |
| 2,523,576 | Kornei | Sept. 26, 1950 |
| 2,536,272 | Friend | Jan. 2, 1951 |
| 2,540,406 | Ranger | Feb. 6, 1951 |
| 2,547,737 | Blaney | Apr. 3, 1951 |
| 2,549,771 | Camras | Apr. 24, 1951 |

FOREIGN PATENTS

| Number | Country | Date |
|---|---|---|
| 937,535 | France | Mar. 8, 1948 |